Patented June 30, 1942

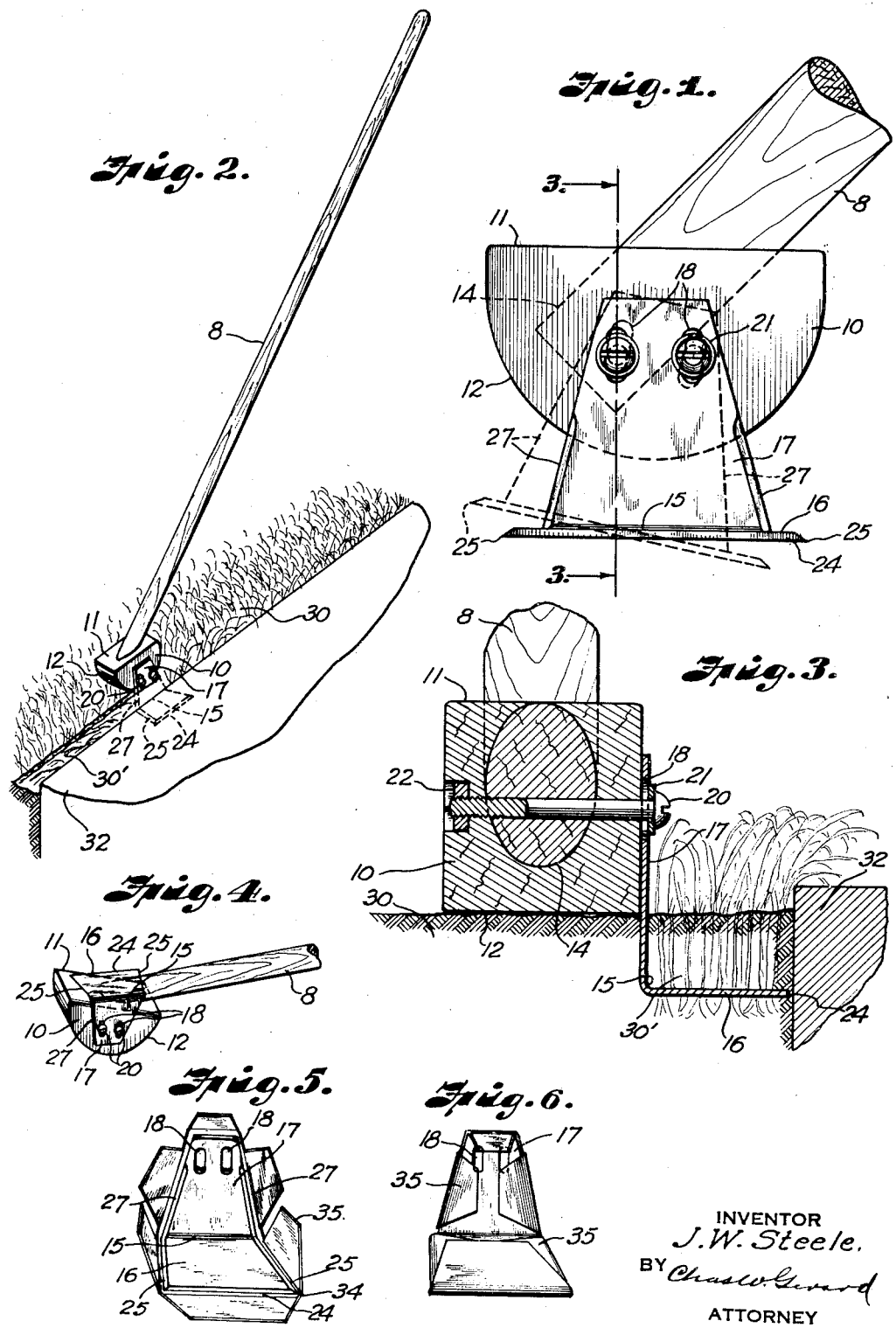

2,288,374

UNITED STATES PATENT OFFICE 2,288,374

LAWN EDGING, WEEDING, AND SOIL-WORKING TOOL

James W. Steele, North Kansas City, Mo.

Application June 3, 1940, Serial No. 338,481

1 Claim. (Cl. 97—227)

The present invention relates to lawn and garden implements, with particular reference to lawn edging appliances which may also be operated for other functions such as weeding and soil mulching.

Accordingly a purpose of the invention is to provide an implement of very simple construction comprising a handle and improved blade or cutting element, and also a combination supporting and gaging member for regulating and gaging the operation of the device as a lawn-edging implement.

It is also sought to provide an implement which is not only simple and inexpensive in its construction but which also includes adjusting means for regulating the operative relation of its working portion as well as the angular position of the handle to suit the convenience of the operator.

With the foregoing general object in view the invention will now be more fully described by reference to the accompanying drawing illustrating a satisfactory and efficient embodiment of the proposed improvements, after which those features of construction and combinations thereof deemed to be novel and patentable will be particularly set forth and claimed.

In the drawing—

Figure 1 is a side elevation showing an implement constructed in accordance with the invention, with the handle portion broken away, and dotted lines representing the working blade or element in different adjusted position;

Figure 2 is a perspective view showing the implement on a smaller scale and in operative use for lawn-edging purposes;

Figure 3 is a sectional view showing such operation and representing a section through the tool, taken on the line 3—3 of Figure 1;

Figure 4 is a perspective view on a smaller scale, with the handle broken away and showing the blade turned and secured in inoperative position;

Figure 5 is an enlarged perspective view of the blade or working portion of the tool, with a protective wrapper designed for enclosing the same, as in shipping; and Figure 6 is a similar view, with said wrapper folded and enclosing the blade.

Referring now to said drawing in detail, this illustrates the improved implement as comprising a handle member 8 of conventional design, and also a suitable combination supporting and gaging member in the form of an approximately semicylindrical block 10, the flat side 11 of which (opposite its curved cylindrical face 12) is provided with an inclined socket 14 into which is snugly fitted the lower end of the handle 8 in angular relation to said upper flat face of the block 10, as illustrated in Figures 1, 2 and 4.

The working element or cutting tool of the implement comprises a blade which is adapted to be constructed from a plate originally of substantially isosceles trapezoidal form, bent at right angles along a line 15 intermediate and parallel to its parallel edges, thereby forming a horizontal blade portion 16 of the wider part of the plate, and an upright blade portion 17 of the remaining portion of the plate constituting the shank or attaching portion of the tool.

This shank or blade portion 17 is formed with a pair of spaced arcuate slots 18 for adjustably securing the tool to one of the side faces of the block 10 by means of bolts 20 provided with washers 21 and extending entirely through the block, and held by nuts 22 which are preferably countersunk in the opposite faces of the block—as clearly shown in Figure 3. One of said bolts also preferably passes through the lower end of the handle 8 for holding the latter securely in attached relation to the block 10.

The converging edges of the plate member from which the working element or cutting tool is constructed are beveled to form cutting edges, leaving the outer longer edge 24 of the horizontal blade portion 16 plane or blunt, as represented in Figure 3,—this being in line with the direction of the operative or cutting movements of the tool. Thus the ends of said horizontal blade portion 16 are formed with inclined or inwardly converging cutting edges 25, whereas the upright blade portion 17 is formed with inclined or upwardly converging cutting edges 27 as continuations from the inner ends of the cutting edges 25. Consequently the tool can be operated with a cutting stroke in either of two opposite directions,—the cutting edges of each pair of edges 25—27 running diagonally with reference to the direction of movement of the tool and combining to form an angular or V-shaped contour of cutting edge, as shown.

The operation of the improved implement is illustrated in Figures 2 and 3. The blade or working element is adjusted to the proper relation to the combination supporting and gaging block 10, as required by both the angle or depth of the cutting action as well as the angle at which the handle 8 is used to suit the particular person operating the device.

For lawn edge cutting or trimming operations the block 10 rides over the top surface of the soil 30 and at a distance away from the walk, coping or other border 32 representing the edge of the lawn, flower bed or the like, such distance being that corresponding to the width of the horizontal portion 16 of the cutting blade. The blade is embedded in the soil to the depth represented by the adjustment of the blade member and as gaged by the lower curved face 12 of the block 10, and then the implement is drawn (or pushed) along with the block riding upon the top surface of the soil, the operation being guided by keeping the blunt edge 24 of the blade portion 16 in engagement with the side of the walk or other border structure 32 and the operator maintaining such guiding engagement by appropriate manipulation of the handle 8. The cutting action obviously takes place by the combined shearing cut of the edges 25—27, to sever a strip or ribbon 30' of the soil adjacent to the border 32, as clearly illustrated in Figures 2 and 3. If desired to remove the strip of soil 30' from the trench thus cut, the implement can be operated to tilt the blade portion 16 for that purpose and to pull the loose cut portion of the soil out of the trench; or said blade portion 16 can be maintained horizontal, as represented in Figure 2, to leave the cut and loosened portions of the soil in the trench after carrying out the necessary operation for cutting and trimming the soil edge to stop the excess plant growth and preserve the neat appearance of the margin of the lawn—or flower or garden bed, etc.

The improved construction is also adapted for carrying out the operation of the implement for soil cultivating or mulching purposes, as well as weeding of flower or garden beds, since the working element or cutting blades may be set at various angles adapted for such use; and where the soil is not too hard, the implement can be turned to use the longer straight blunt edge 24, in the manner of a hoe, as will be readily understood.

An improved feature of advantage in connection with the improvements is the form of gage block element 10, which not only accommodates all the required adjustments of the working element or blade to different working angles as well as to different heights representing different depths of cutting action, but also the angular relation of the handle member 8 to suit the convenience of the operator.

Obviously such adjustments are readily made by simply loosening the nuts 22 and shifting the working element or blade structure by means of the curved slots, and again tightening or clamping said nuts 22.

Figures 4 to 6 illustrate an advantageous method of protecting the working element or blade structure when the implement is not in use, or for shipping purposes. To this end, a cover or shield 34 is provided, having the same general shape and size as the blade device for fitting against one face thereof, and also having wings or tab elements 35 for folding over against the other face of the blade, as clearly shown in Figures 5 and 6. With the working element or blade thus enclosed it may be simply reversed in position and re-secured by the bolts 20, as shown in Figure 4, in which position said wings or tabs are held in place between the blade and the block member 10,—Figure 4 however merely showing such reversed position of the blade without any shield or protective cover applied thereto.

While the foregoing sets forth a practical and efficient embodiment of the proposed improved construction, it is of course apparent that changes or modifications may be made within the principle or scope of my invention, and I therefore desire to reserve the right to make such changes or variations as may fairly fall within the spirit and scope of the appended claim.

What I claim is:

A lawn edging and soil cultivating implement comprising a combination gaging and supporting block having a flat upper face and a curved bottom face for rocking engagement upon the soil surface, a handle secured in inclined relation to the upper face of said block, and a cutting blade comprising an upright shank portion attached to one of the side faces of said block and a horizontal portion formed with an outer straight edge for abutting engagement with a guiding means, said upright and horizontal blade portions having front and rear cutting edges converging continuously from said outer straight edge to the extreme upper end of said upright shank portion of the blade.

JAMES W. STEELE.